(12) United States Patent
Ustuntas et al.

(10) Patent No.: US 11,361,565 B2
(45) Date of Patent: Jun. 14, 2022

(54) NATURAL LANGUAGE PROCESSING (NLP) PIPELINE FOR AUTOMATED ATTRIBUTE EXTRACTION

(71) Applicant: The Boeing Company, Chicago, IL (US)

(72) Inventors: Sema Ustuntas, Redmond, WA (US); Kris Fantin Nunes, Bellevue, WA (US); Krishna Srinivasmurthy, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 259 days.

(21) Appl. No.: 16/711,619

(22) Filed: Dec. 12, 2019

(65) Prior Publication Data

US 2021/0182549 A1    Jun. 17, 2021

(51) Int. Cl.
*G06V 30/413* (2022.01)
*G06V 10/22* (2022.01)
*G06V 20/62* (2022.01)
*G06V 30/224* (2022.01)

(52) U.S. Cl.
CPC ........... *G06V 30/413* (2022.01); *G06V 10/22* (2022.01); *G06V 20/62* (2022.01); *G06V 30/224* (2022.01)

(58) Field of Classification Search
CPC ........... G06K 9/00442; G06K 9/00456; G06K 9/00463; G06K 9/18; G06K 9/46; G06K 9/325; G06K 9/2054; G06V 30/224; G06V 30/413; G06V 20/62; G06V 10/22
USPC ........................................ 382/190, 224, 225
See application file for complete search history.

(56) References Cited

U.S. PATENT DOCUMENTS

| | | | |
|---|---|---|---|
| 4,030,068 A | 6/1977 | Banz | |
| 2015/0120738 A1* | 4/2015 | Srinivasan | G06F 16/285 707/739 |
| 2019/0147103 A1* | 5/2019 | Bhowan | G06N 5/022 707/737 |

* cited by examiner

*Primary Examiner* — Daniel G Mariam
(74) *Attorney, Agent, or Firm* — Coats & Bennett, PLLC (57) ABSTRACT

A method for training a filter-based text recognition system for cataloging image portions associated with files using text from the image portions, the method comprising: receiving a first set of text represented in a first image portion associated with a first file; classifying the first image portion into a predetermined group, wherein the classifying is based at least in part on the first set of text; extracting a first set of features from the first set of text; harmonizing existing data in the predetermined group with the first set of text to modify the first set of features; categorizing the first set of text; and determining analytics-based rules based at least in part on the first set of features.

20 Claims, 7 Drawing Sheets

NATURAL LANGUAGE PROCESSING (NLP) PIPELINE FOR AUTOMATED ATTRIBUTE EXTRACTION

TECHNOLOGICAL FIELD

The present disclosure relates generally to the field of natural language processing. More specifically the present disclosure relates to the field of filter-based text recognition and training of the same.

BACKGROUND

Widely used as a form of data entry from printed paper data records, optical character recognition (OCR) is a common method of digitizing printed texts so that they can be electronically edited, searched, stored more compactly, displayed on-line, and used in various manners such as machine translation and text-to-speech. OCR is a field of research in pattern recognition, artificial intelligence, and computer vision.

Early versions needed to be trained with images of each character, and worked on one font at a time. Advanced systems capable of producing a high degree of recognition accuracy for most fonts exist with support for a variety of digital image file format inputs. Some systems are capable of reproducing formatted output that closely approximates the original page including images, columns, and other non-textual components.

There are two basic types of OCR, which may produce a ranked list of candidate characters: matrix matching and feature extraction.

Matrix matching involves comparing an image to a stored glyph on a pixel-by-pixel basis. It is also known as "pattern matching", "pattern recognition", or "image correlation". Matrix matching relies on an input glyph being correctly isolated from the rest of the image and on the stored glyph being in a similar font at the same scale. This technique works best with typewritten text and does not work well when new fonts are encountered.

Feature extraction decomposes glyphs into "features" like lines, closed loops, line direction, and line intersections. The extraction features reduces the dimensionality of the representation and makes the recognition process computationally efficient. These features are compared with an abstract, vector-like representation of a character, which might reduce to one or more glyph prototypes. General techniques of feature detection in computer vision are applicable to this type of OCR, which is commonly seen in "intelligent" handwriting recognition. Nearest neighbor classifiers are used to compare image features with stored glyph features and choose the nearest match.

OCR accuracy can be increased if the output is constrained by a lexicon—a list of words that are allowed to occur in a document. This might be, for example, all the words in the English language, or a more technical lexicon for a specific field. This technique can be problematic if the document contains words not in the lexicon, like proper nouns.

The output stream may be a plain text stream or file of characters, but more sophisticated OCR systems can preserve the original layout of the page and produce, for example, an annotated PDF that includes both the original image of the page and a searchable textual representation. "Near-neighbor analysis" can make use of co-occurrence frequencies to correct errors, by noting that certain words are often seen together. For example, "Washington, D.C." is generally far more common in English than "Washington DOC". Knowledge of the grammar of the language being scanned can also help determine if a word is likely to be a verb or a noun, for example, allowing greater accuracy.

Determining information from generic OCR results is not always efficient or cost effective when trying to obtain results for activities like data mining. Creating a specialized OCR dictionary can be labor-intensive. Therefore, a need for a system that is easy to tailor and maintain is desirable.

SUMMARY

According to one aspect of the present application, a method for training a filter-based text recognition system for cataloging image portions associated with files using text from the image portions is disclosed, the method including receiving a first set of text represented in a first image portion associated with a first file. The method further includes classifying the first image portion into a predetermined group, wherein the classifying is based at least in part on the first set of text. The method further includes extracting a first set of features from the first set of text. The method further includes harmonizing existing data in the predetermined group with the first set of text to modify the first set of features. The method further includes categorizing the first set of text. The method further includes determining analytics-based rules based at least in part on the first set of features.

According to further aspects, disclosed methods further include aggregating the first set of text with the grouped data According to further aspects, disclosed methods further include harmonizing the aggregated data and a second set of text into a second set of features, wherein the second set of text is represented in a second image portion classified into the predetermined group. Disclosed methods further include analyzing the second set of features. Disclosed methods further include adapting at least one of the classifying step and the harmonizing step based on the analyzed second set of features.

According to further aspects, disclosed methods further include sorting the first set of text into predetermined structures, wherein the predetermined structures comprise at least one of the group consisting of words, numbers, dates, sentences, paragraphs, tables, and alphanumeric codes.

According to further aspects, the classification of the first image portion is based at least in part on the predetermined structures into which the text is sorted.

According to further aspects, disclosed methods further include receiving a second set of text, wherein the second set of text is not obtained from the first image portion.

According to further aspects, disclosed methods further include at least one of adding and modifying at least one feature for the first set of features.

According to further aspects, the analytics-based rules are used at least in part to correct errors in the first set of text.

According to further aspects, the method is performed on a large area network.

In another aspect, the present application discloses a filter-based text recognition system for cataloging image portions associated with files using text from the image portions. The system includes a memory and a processor coupled with the memory. The processor is operable to receive a first set of text represented in a first image portion associated with a first file. The processor is operable to classify the first image portion into a predetermined group, wherein the classifying is based at least in part on the first set of text. The processor is operable to extract a first set of features from the first set of text. The processor is operable to harmonize existing data in the predetermined group with the first set of text to modify the first set of features. The processor is operable to categorize the first set of text. The processor is operable to determine analytics-based rules based at least in part on the first set of features.

According to further aspects, the processor is further operable to aggregate the first set of text with the grouped data.

According to further aspects, the processor is further operable to harmonize the aggregated data and a second set of text into a second set of features, wherein the second set of text is represented in a second image portion classified into the predetermined group. The processor is further operable to analyze the second set of features. The processor is further operable to adapt at least one of the classifying step and the harmonizing step based on the analyzed second set of features.

According to further aspects, the processor is further operable to sort the first set of text into predetermined structures, the predetermined structures comprise at least one of the group consisting of words, numbers, dates, sentences, paragraphs, tables, and alphanumeric codes.

According to further aspects, the classification of the first image portion is based at least in part on the predetermined structures into which the text is sorted.

According to further aspects, the processor is further operable to receive a second set of text, wherein the second set of text is not obtained from the first image portion.

According to further aspects, the first set of text is obtained using an optical character recognition technique.

According to further aspects, the processor is further operable to add and modify at least one feature for the first set of features.

According to further aspects, the system is a large area network.

In another aspect, the present application discloses a non-transitory computer-readable storage medium for cataloging image portions associated with files using text from the image portions, the computer-readable storage medium being non-transitory and having computer-readable program code portions stored therein that in response to execution by a processor, cause an apparatus to receive a first set of text represented in a first image portion associated with a first file. The apparatus is caused to classify the first image portion into a predetermined group, wherein the classifying is based at least in part on the first set of text. The apparatus is caused to extract a first set of features from the first set of text. The apparatus is caused to harmonize existing data in the predetermined group with the first set of text to modify the first set of features. The apparatus is caused to categorize the first set of text. The apparatus is caused to determine analytics-based rules based at least in part on the first set of features.

According to further aspects, the apparatus is caused to aggregate the first set of text with the grouped data.

According to further aspects, the apparatus is caused to harmonize the aggregated data and a second set of text into a second set of features, wherein the second set of text is represented in a second image portion classified into the predetermined group According to further aspects, the apparatus is caused to analyze the second set of features.

According to further aspects, the apparatus is caused to adapt at least one of the sorting, classifying, comparing, and harmonizing steps based on the analyzed second set of features.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Having thus described variations of the disclosure in general terms, reference will now be made to the accompanying drawings, which are not necessarily drawn to scale, and wherein:

DETAILED DESCRIPTION

Figure 1:
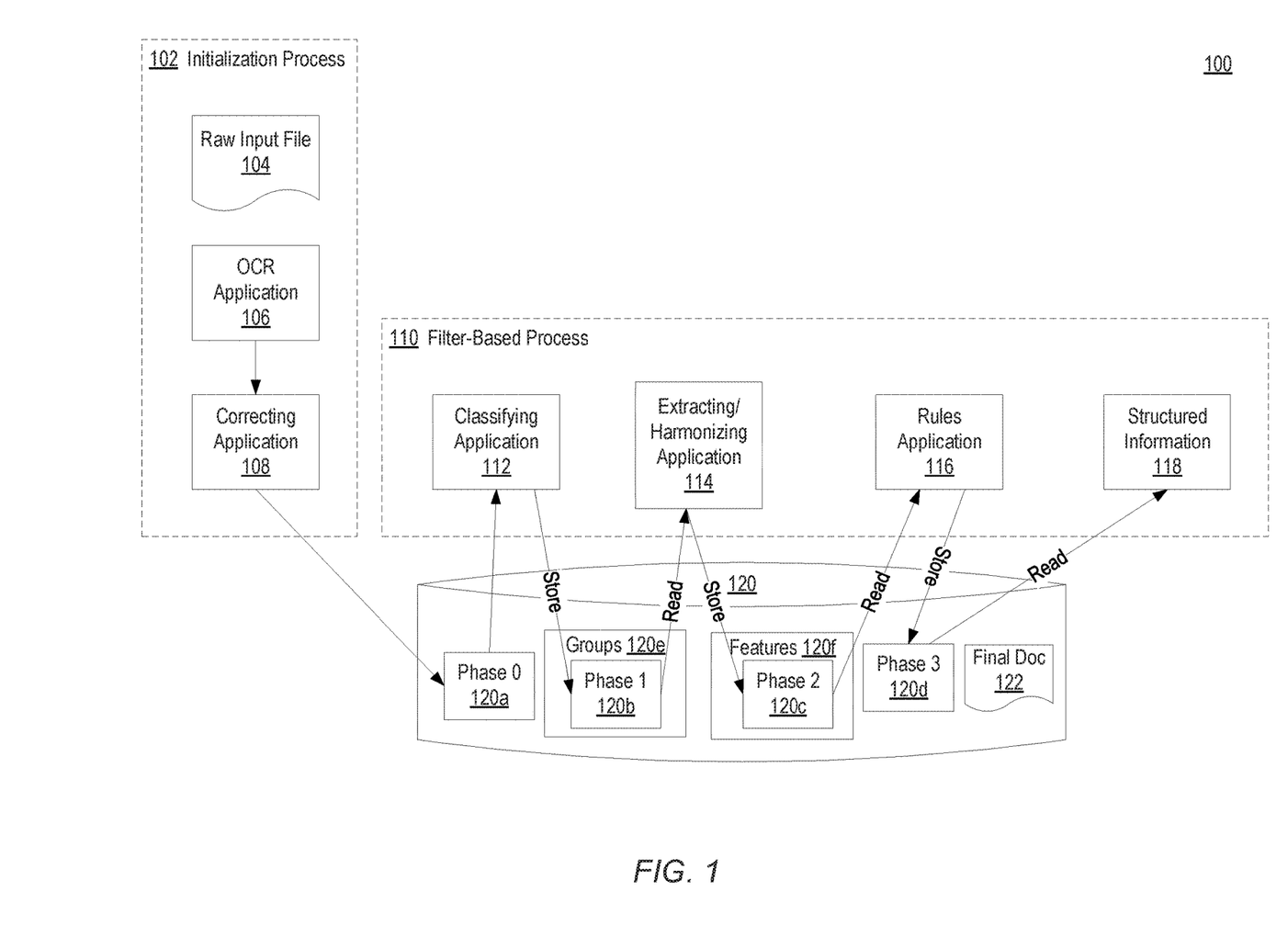
FIG. 1 is an illustration of a system of a filter-based text recognition system according to one embodiment.

FIG. 1 is an illustration of a system 100 of a filter-based text recognition system according to one embodiment. In system 100, which can be a large area network, an initialization process 102 includes a raw input file 104 being put through an OCR application 106 and a correcting application 108. The initialization process then leads to a filter-based process 110 with a classifying application 112, an extracting/harmonizing application 114, and a rules application 116, for outputting structured information 118.

The system 100 has the filter-based process 110 work in tandem with a data store 120 that stores each result of the applications in the filter-based process and allows an application to read data from an application that generated the data. The results of the processing can be stored as a final document 122. The raw input file 104 can be various types of data. In FIG. 1, the data can be an image portion of a file, such as a scanned document image. The raw input file 104 can be processed by the OCR application 106 and then have the text from the data refined by the correcting application 108 to improve the syntax and accuracy provided by the OCR application 106. Once the correcting application 108 has processed the data, it can send its results to the data store 120 as phase 0 data 120a.

In some embodiments, the phase 0 data 120a is a first set of text that is read by the classifying application 112. The classifying application 112 can classify the phase 0 data 120a into a predetermined group 120e, wherein the classifying is based at least in part on the first set of text. For example, the data can be classified into a particular type of document such as a contract, a Material Safety Data Sheet (MSDS), a letter of engagement, etc. Once the classifying application 112 has processed the phase 0 data 120a that it has read, it transmits the processed data to the data store 120 to be stored as phase 1 data 120b.

The phase 1 data 120b is read by the extracting/harmonizing application 114. Much like any of the disclosed applications, in some embodiments, the extracting/harmonizing application 114 can be a single application or multiple applications. The extracting/harmonizing application 114 can extract a first set of features from the first set of text. The extracting/harmonizing application 114 can also harmonize existing data in the predetermined group 120e with the first set of text to modify the first set of features. The extracting/harmonizing application 114 then stores the extracted features and harmonized data, at least in part, as phase 2 data 120c in the data store 120, where it may be associated with other sets of features 120f. The phase 2 data 120c is read by the rules application 116. The rules application 116 uses the phase 2 data 120c to determine analytics-based rules based at least in part on the first set of features. The rules application 116 then generates phase 3 data 120d. The phase 3 data 120d is then read into the structured information 118, where it is categorized.

In some embodiments, the data in the data store 120 being stored in different iterations for comparison allows for improvements on individual applications. Comparing various filtered documents and finding a recurring error is not uncommon in text recognition. Having the ability for the system 100 to examine the data as it is processed to determine where the error occurred in order to improve that particular application allows for a self-improving system with higher efficiency and accuracy.

Figure 2:
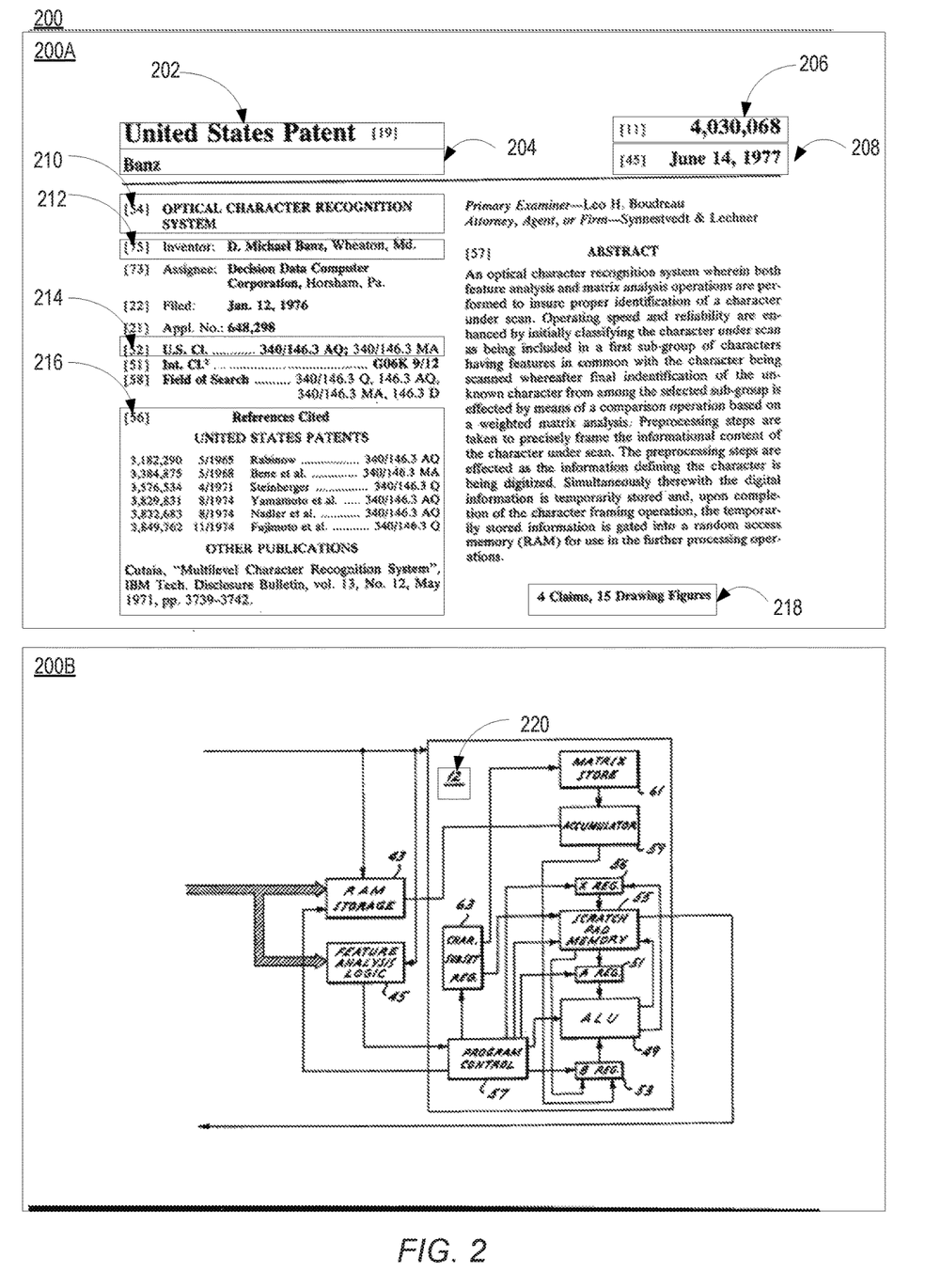
FIG. 2 is an illustration of a file for performing filter-based text recognition according to one embodiment.

FIG. 2 is an illustration of the first page 200 of an issued U.S. patent, U.S. Pat. No. 4,030,068 with a first image portion 200A and a second image portion 200B. On the first page 200, there are multiple predetermined structures. The document type structure 202 provides for the type of document—a U.S. Patent. The first named inventor's last name is found in the first inventor structure 204. The patent number structure 206 and the issued date structure 208 are on the right hand side of the top of the document. These four predetermined structures 202, 204, 206, and 208 are always in those places from patents issued for over 50 years. The predetermined structures 202, 204, 206, and 208 are all alphanumeric. However, in a filter-based text recognition system such as those in FIGS. 2 and 3 allow the predetermined structures 202, 204, 206, and 208 to assist in classifying the first page 200 shown. For example, document type structure 202 can be used to identify that the first page 200 is a U.S. utility patent. If that portion of the document is not read exactly as "United States Patent [19]", other predetermined structures can assist in classifying the first page 200. For example, a classification might be aided in determining that a seven or eight digit number is on the top right of the image portion, including commas in the American style after the millions and thousands places. The likelihood that the predetermined structure being a patent number structure is heightened if the beginning of the predetermined structure is a code in brackets such as "[11]" as shown in the patent number structure 206 in the first page 200.

Likewise, there may be predetermined structures such as the alphanumeric codes in the U.S. Classifier structure 214. When classifying the first page 200, some embodiments may use such alphanumeric codes first. Some embodiments may use a table such as the references cited structure 216 to determine if the first image 200 belongs with files already sorted. In some embodiments, predetermined structures can be used to compare data with each other to ensure text recognition processes are functioning correctly. For example, the first inventor structure 204 and the inventor structure 212 will share at least one word—the last name of the first named inventor.

In some embodiments, the predetermined structure showing the number of claims and figures, claims/figures structure 218, may assist in grouping different image portions together to determine which image portions belong to the same document. For example, the system could review various image portions with the same patent number structure 206 and determine that image portions without many predetermined structures besides patent number structure 206 can be classified as figures. With the claims/figures structure 218, the number of such identified figures can be compared to the expected number in the claims/figures structure 218.

In the second image portion 200B, a drawing with reference numbers and English words is shown. In some documents, figures may have been drafted by hand and can include characters that are not rendered by a computer, such as with a TRUETYPE® Font or an OPENTYPE® Font. Reference number 220 is rendered by hand. As shown below, some previous methods may not recognize any characters in such a style.

Some embodiments will provide better data than current OCR methods. For example, Table 1 provides data collected from running the first page of U.S. Pat. No. 4,030,068 from FIG. 2 into the PDF to text OCR converter on online.sodapdf.com in the second column from various predetermined structures as compared to data in the third column. As shown, Michael Banz's last name is correct in the example of the embodiment while the text from the inventors structure 212 shows his name as "Danz" rather than "Banz" in one result. Likewise, certain characters are not properly recognized, such as the square brackets in the document type structure 202.

TABLE 1

| Ref. Num. | OCR results | Text with formatting |
|---|---|---|
| 202 | Ited<br>United<br>States<br>States Patent<br>Patent<br>c191<br>(19) | United States patent [19] |
| 204 | Banz | Banz |
| 206 | [11] 4,030,068 | [11] 4,030,068 |
| 208 | (45)<br>4,030,068.<br>4,030,068<br>Jun. 14, 1977<br>Jun. 14, 1977 | [45] Jun. 14, 1977 |
| 210 | PTICAL<br>OPTICAL | [54] OPTICAL CHARACTER<br>RECOGNITION SYSTEM |

TABLE 1-continued

| Ref. Num. | OCR results | Text with formatting |
|---|---|---|
|  | CHARACTER<br>CHARACTER RECOGNITION<br>RECOGNITION<br>SYSTEM |  |
| 212 | Inventor:<br>Inventor:<br>D.<br>D.<br>Michael<br>Michael<br>Danz,<br>Banz,<br>Wheaton,<br>Wheaton,<br>Md.<br>Md. | [75] Inventor: D. Michael Banz,<br>Wheaton, Md. |
| 214 | [52] U.S. Cl•. . . 340/146.3 AQ; 340/146.3 MA<br>52 U.S. C. . . . 340/146.3 AQ: 340/146.3 MA | [52] U.S. Cl. . . . 340/146.3 AQ; 340/146.3 MA |
| 216 | [56] References Cited<br>UNITED STATES patents•<br>3,182,290 May 1965 Rabinow . . . 340/146.3 AO<br>3,384,875 May 1968 Bene et al. . . . 340/f46.3 MA<br>3,576,534 April 1971 Steinberger . . . 3•40/146.3 O<br>3,829,831 August 1974 Yamamoto et al . . . 340/146.3 AO<br>3,832,683 August 1974 Nadler et al. . . . 340/146.3 AO<br>3,849,762 November 1974 Fujimoto et al. . . . 340/146.3 O | [56] References Cited<br>UNITED STATES patents<br>3,182,290 May 1965 Rabinow . . . 340/146.3 AQ<br>3,384,875 May 1968 Bene et al. . . . 340/146.3 MA<br>3,576,534 April 1971 Steinberger . . . 340/146.3 Q<br>3,829,831 August 1974 Yamamoto et al . . . 340/146.3 AQ<br>3,832,683 August 1974 Nadler et al. . . . 340/146.3 AQ<br>3,849,762 November 1974 Fujimoto et al. . . . 340/146.3 Q |
| 218 | aims,<br>Claims,<br>15<br>15<br>Drawing<br>Drawing<br>Figures<br>Figu | 4 Claims, 15 Drawing Figures |
| 220 |  | 12 |

As shown, Table 1 illustrates some of the advantages of the text-based recognition system over prior art in determining the data from FIG. 2.

Figure 3:
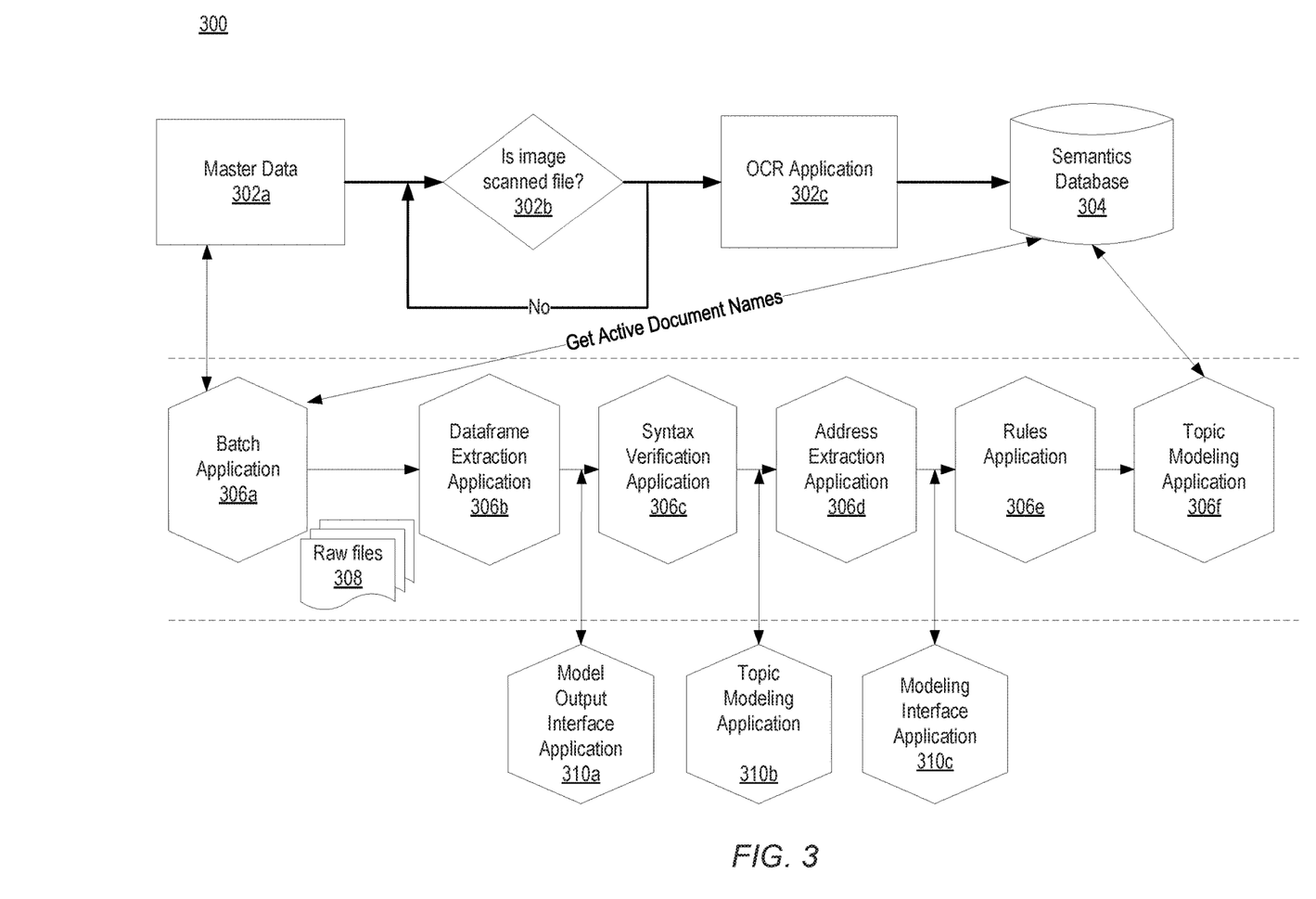
FIG. 3 is an illustration of a sequence of a filter-based text recognition system according to one embodiment.

FIG. 3 is an illustration of a sequence 300 of a filter-based text recognition system according to one embodiment. The sequence 300 includes a master data store 302a that provides data for processing. In some embodiments, the sequence 300 determines in 302b whether an image portion from the master data store 302a is a scanned PDF. If the image is a scanned PDF or similar file, the sequence 300 runs the image portion through an OCR application 302c, and stores the results in a semantics data store 304. In some embodiments, the semantics data store 304 keeps data in the state generated by the OCR Application 302c. The OCR data can be compared to the same data after it has been processed by more applications in the sequence 300.

The image portion can be "ingested" by a batch application in 306a to generate a raw file 308, such as an active PDF. The raw files 308 can be sent to a data frame extraction application 306b to take a data frame from the raw files 308. For example, the first page 200 of FIG. 2 can be sorted into various predetermined structures in order to determine the general format of the file.

The extracted data from the raw files 308 can be processed by a syntax verification application 306c. For example, the syntax verification application 306c can use a spell checking function for predetermined structures like paragraphs. The syntax verification application 306c can also remove data that is not unique to the image portion and is also considered unimportant, such as data in a header or footer of an image file from a particular website.

The sequence can continue processing with an address extraction application 306d.

Next, a rules application 306e can run in the sequence. The rules application 306e can extract specific, desired information based on particular rules. For example, the desired data from the raw files 308 may be the patent numbers from the references cited structure 216 in FIG. 2. A rule might exist that the first character string starting at the third line of any references cited structure must be flagged for a particular use, such as determining which references may be required for a related patent application's information disclosure statement.

A topic modeling application 306f can also perform functions such as tagging particular image portions for specific features, work within hyperparameters to generate clusters of words, and reduce words in an image portion to topics for easier categorization and recognition.

The sequence 300 can also have multiple natural language processing plug in applications. As shown, the sequence 300 can include a model output interface application 310a, a topic modeling application 310b, and a modeling interface application 310c. Natural language processing is a constantly developing field, and the sequence 300 allows different natural language processing frameworks to be introduced while maintaining overall functionality.

Figure 4A:
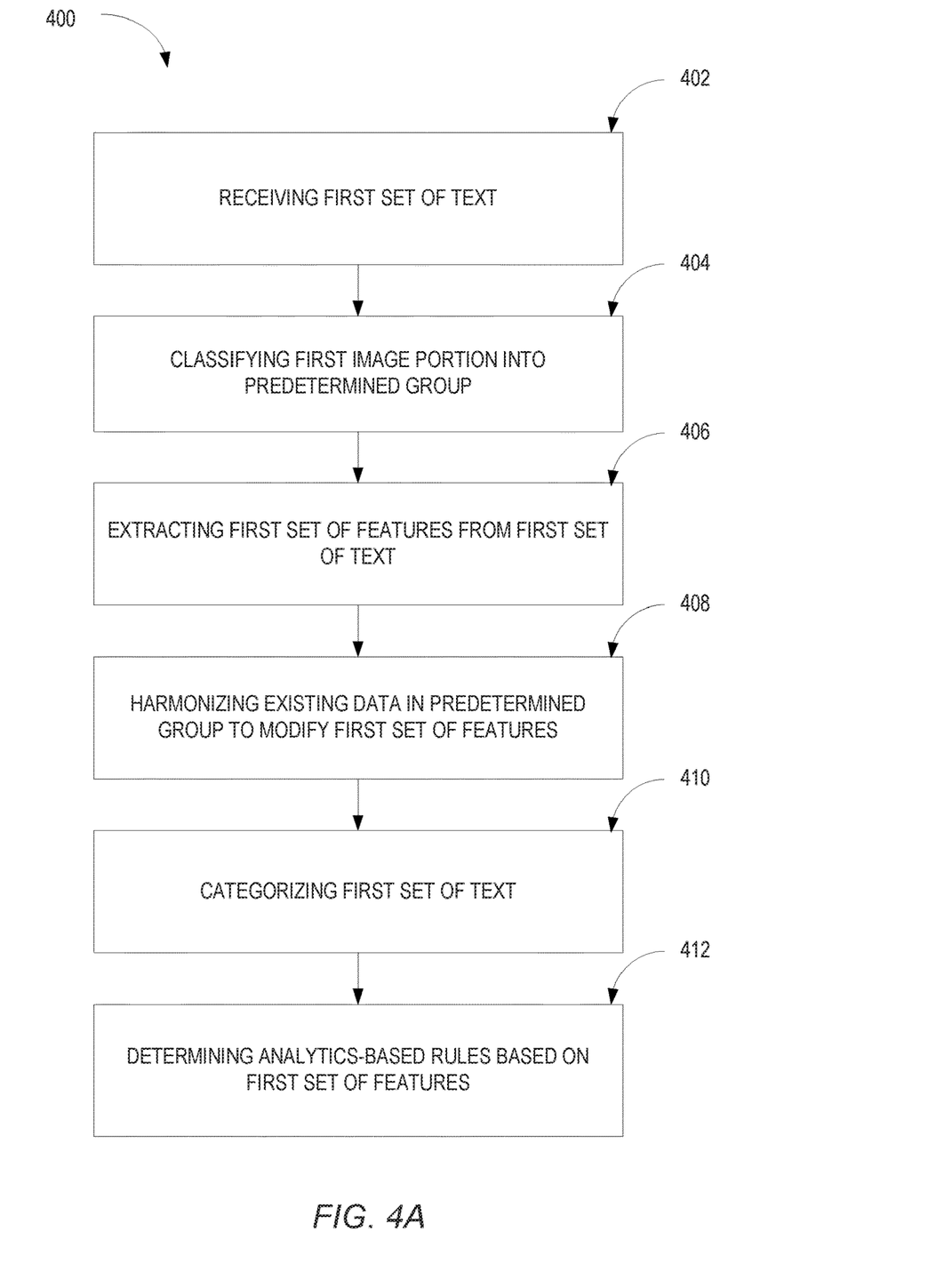
FIG. 4A is a flowchart that illustrates filter-based text recognition according to one embodiment.

FIG. 4A is a flowchart that illustrates filter-based text recognition according to one embodiment. FIGS. 1-3 may be used to describe a method 400 of FIG. 4 in greater detail. In FIG. 4A, the method 400 includes receiving 402 a first set of text receiving a first set of text represented in a first image portion 200A associated with a first file 104. In some embodiments, a file 104 may comprise multiple images 200A, 200B of documents with text, such as scanned paper, microfiche, and the like. Some files may have more than one document on an image, such as is typically the case with microfiche. Some files may contain only one page from a document. Some files may comprise a decade's worth of information. The text in a file may be first analyzed using various means, including matrix matching OCR and feature extraction OCR.

The method 400 further includes classifying 404 the first image portion 200A into a predetermined group 120e, wherein the classifying 404 is based at least in part on the first set of text 120a. For example, the method 400 can use portions of the first set of text 120a to look for phrases or orders of words that match phrases or orders of words in predetermined groups 120e.

In some embodiments, the method 400 can include sorting the first set of text 120a into predetermined structures 202, 204, 206, 208, 210, 212, 214, 216, 218, wherein the predetermined structures comprise at least one of the group consisting of words 210, numbers 206, dates 208, sentences, paragraphs, tables 216, and alphanumeric codes 214. For example, FIG. 2 has various types of predetermined structures in the same first page 200. In some embodiments, the classification 404 of the first image portion 200A is based at least in part on the predetermined structures 202, 204, 206, 208, 210, 212, 214, 216, 218 into which the text is sorted. For example, the first page 200 of FIG. 2 can be classified as a patent document based at least in part on the document type structure 202.

The method 400 further includes extracting 406 a first set of features 120c from the first set of text 120a. In some embodiments, the method 400 can use the predetermined group 120e to find the first set of features 120c in the first set of the text 120a. For example, the method 400 can determine the inventor feature 212 because the predetermined group 120e has an inventor feature in each first image 200A. In one example, the method 400 may designate a space for a featured figure on a patent based on a predetermined group.

The method 400 further includes harmonizing 408 existing data in the predetermined group 120e with the first set of text 120a to modify the first set of features 120c. In some embodiments, the method 400 can also include at least one of adding and modifying at least one feature for the first set of features 120c. For example, the references cited structure 216 can include foreign patent references. Modifying or adding a feature to include such references and properly store that data could be advantageous.

The method 400 further includes categorizing 410 the first set of text 120a. In some embodiments, the first set of text 120a can be tagged as a category to cross reference various data, such as final documents 122, in the data store 120 of FIG. 1. Here, documents that are related, but do not belong to the same predetermined group, can be categorized similarly. For example, a contract to purchase a particular item could be categorized with a Bill of Sale in order to cross-reference the information. Such categories could also apply to larger projects. In some embodiments, categorization can allow for more accurate data with regard to issues that arise with standard OCR methods, such as proper nouns or acronyms that are specific to a particular project or department.

The method 400 further includes determining 412 analytics-based rules 120d based at least in part on the first set of features 120c. In some embodiments, the analytics-based rules 120d are used at least in part to correct errors in the first set of text 120a. For example, the first page 200 of FIG. 2 shows a number of references cited, but in another patent, a second page can include more references than what would be listed in the references cited structure 216. An analytics-based rule 120d may exist to look for the term "CON' T" in the references cited structure 216. The analytics-based rule 120d can then determine that references from the second page of the second patent can be appended to the references from the references cited structure 216 of the first page of the second patent so that a full information disclosure statement can be generated for a related or similar application.

In some embodiments, the method 400 can also include receiving a second set of text 220, wherein the second set of text 220 is not obtained from the first image portion 200A. In some embodiments, the method 400 can be performed on a large area network 100. In some embodiments the method 400 can be performed on a private network to ensure data privacy.

Figure 4B:
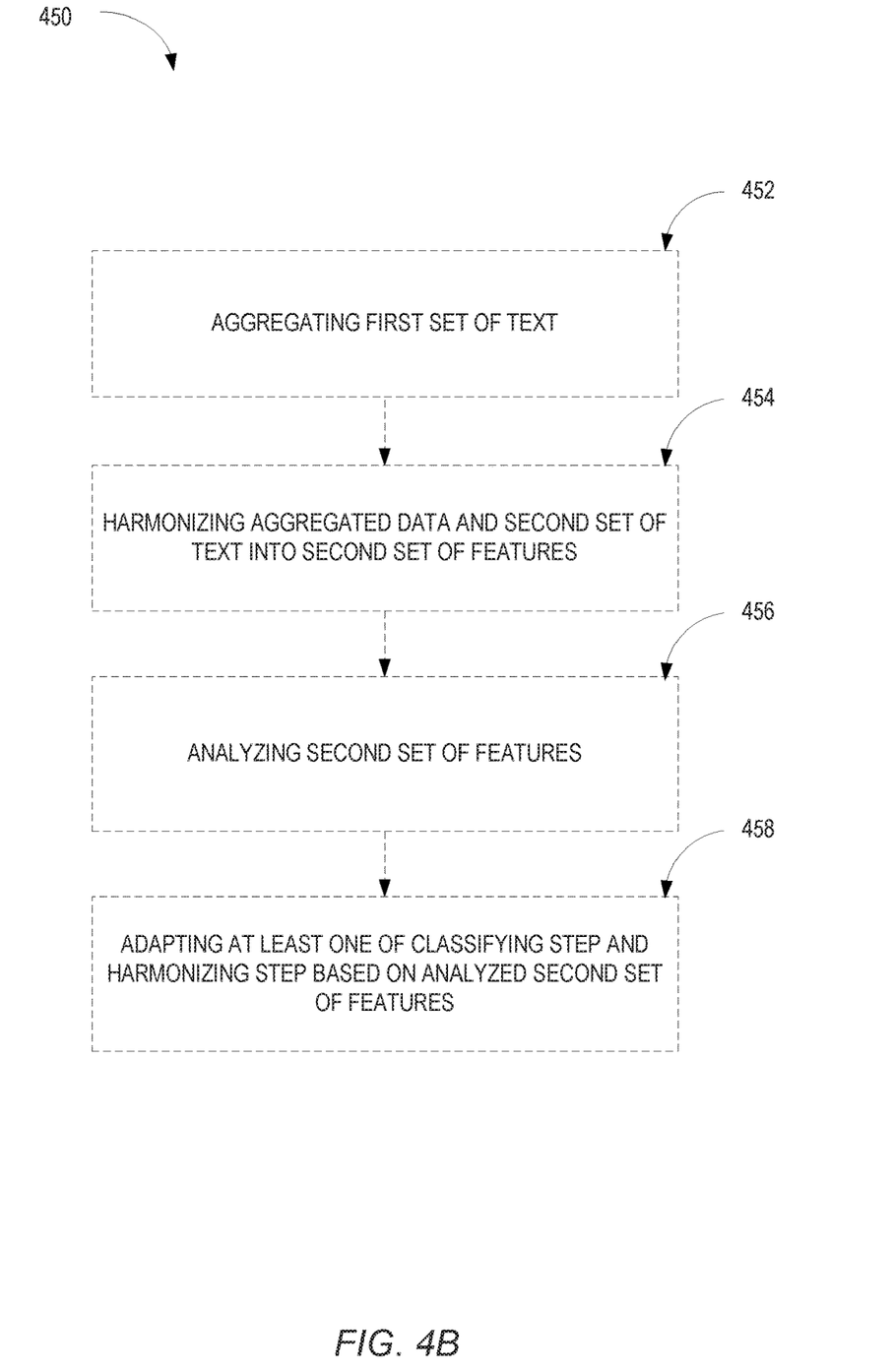
FIG. 4B is a flowchart that illustrates filter-based text recognition according to one embodiment.

FIG. 4B is a flowchart that illustrates filter-based text recognition according to one embodiment. In some embodiments, the method 450 can be used in conjunction with method 400 of FIG. 4A.

The method 450 includes aggregating 452 the first set of text 120a with the existing data 120 of FIG. 1. In some embodiments, the method 450 can also include harmonizing 454 the aggregated data 120 and a second set of text 220 into a second set of features 120f, wherein the second set of text 220 is represented in a second image portion 200B classified into the predetermined group 120e. The method 450 can include analyzing 456 the second set of features 120f. The method can include adapting 458 at least one of the classifying step 404 and the harmonizing step 408 based on the analyzed second set of features 120f.

Figure 5:
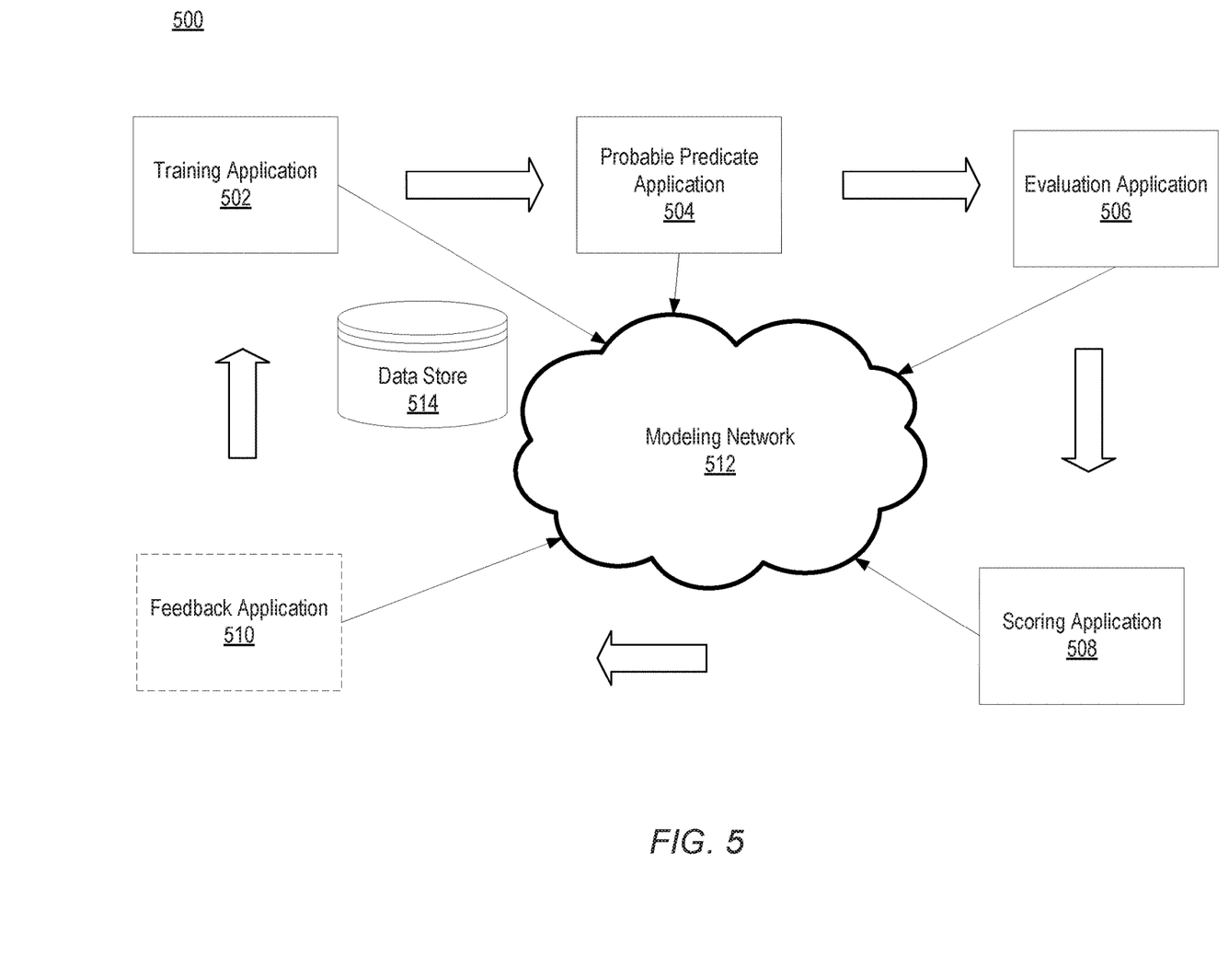
FIG. 5 is an illustration of a filter-based text recognition system according to one embodiment.

FIG. 5 is an illustration of a filter-based text recognition system 500 according to one embodiment. The system 500 has multiple applications, such as a training application 502, a probable predicate application 504, an evaluation application 506, and a scoring application 508. In some embodiments, the system 500 can have a feedback application 510. The system 500 is connected by a modeling network 512 with a data store 514.

In the training application 502, an initial training set is run. The training application 502 can use data to determine at least one of a predetermined group, a set of features, a category, and analytics-based rules. The training application 502 can identify and present a list of possible predicates to a verification system (not shown).

In the probable predicate application 504, a probable predicate list can be generated from the possible predicted list using a scoring system. The probable predicate application 504 can weigh terms in the probable predicate list. In some embodiments, the probable predicate list can be sorted, for example, in order from most probable to least probable.

In the evaluation application 506, the probable predicate list can be sent to the system 100. In some embodiments, the efficacy of the probable predicate list can be evaluated by the evaluation application 506. In some embodiments, the evaluation application 506 can provide data from the system 100 to the scoring application 508.

In the scoring application 508, the data from the evaluation application 506 can be processed to provide feedback regarding the success or failure of the probable predicate list in the system 100. In some embodiments, the scoring application 508 can generate a report regarding the success of the probable predicate list. In some embodiments, these reports can be used to determine the best probable predicate list out of a series of scored lists.

In the feedback application 510, which is shown in FIG. 5 as an optional application, an outside source can view the probable predicate list scoring. The feedback application 510 can provide changes to the probable predicate list in order to improve the data that is sent to the training application 502. In some embodiments, the data from the scoring application 508 can be sent directly to the training application 502.

In some embodiments, all data input and output from the applications 502, 504, 506, 508, 510 is stored in the data store 514, similar to the data store 120 storing separate phase data in order to determine where errors are occurring within the system 500. In some embodiments, users can view the results of each application's output to review the output of each application and determine if the data is corrupted, the application is failing, etc. In some embodiments, the applications can exist as a plug-and-play system so that improvements in one application can be implemented without having to redesign all the other applications.

Figure 6:
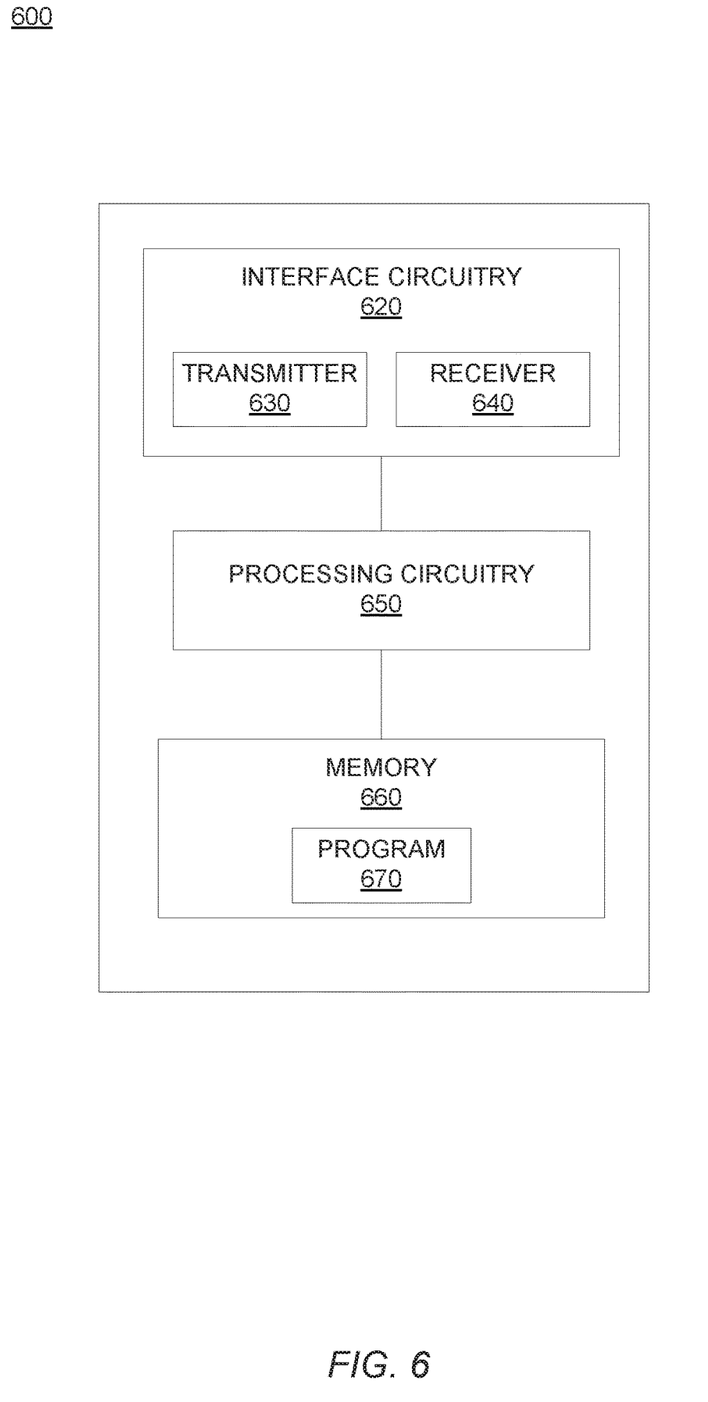
FIG. 6 is an illustration of an apparatus according to one embodiment.

FIG. 6 illustrates an apparatus 600 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 650 (e.g., processor unit) connected to a memory 660 (e.g., storage device).

The processing circuitry 650 may be composed of one or more processors alone or in combination with one or more memories. The processing circuitry is generally any piece of computer hardware that is capable of processing information such as, for example, data, computer programs and other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 660 (of the same or another apparatus).

The processing circuitry 650 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 660 is generally any piece of computer hardware that is capable of storing information such as, for example, data, computer programs (e.g., computer-readable program code 670) and other suitable information either on a temporary basis or a permanent basis. The memory may include volatile and non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 660, the processing circuitry 650 may also be connected to one or more interfaces for displaying, transmitting and receiving information. The interfaces may include interface circuitry (e.g. a communications interface) 620. The interface circuitry 620 may be configured to transmit and receive information, such as to and from other apparatus(es), network(s) or the like. The communications interface may be configured to transmit and receive information by physical (wired) and wireless communications links. Examples of suitable communication interfaces include a network interface controller (NIC), wireless NIC (WNIC) or the like. The communications interface may have one or more transmitters 630. The communications interface may have one or more receivers 640.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and execution may be performed in parallel such that multiple instructions are retrieved, loaded, and executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 600 may include processing circuitry 650 and a computer-readable storage medium or memory 660 coupled to the processing circuitry, where the processing circuitry is configured to execute computer-readable program code 670 stored in the memory. It will also be understood that one or more functions, and combinations of functions, may be implemented by special purpose hardware-based computer systems and processing circuitry s which perform the specified functions, or combinations of special purpose hardware and program code instructions.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

By the term "about" or "substantial" and "substantially" or "approximately," with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for training a filter-based text recognition system for cataloging image portions associated with files using text from the image portions, the method comprising:
   receiving a first set of text represented in a first image portion associated with a first file;
   classifying the first image portion into a predetermined group, wherein the classifying is based at least in part on the first set of text;
   extracting a first set of features from the first set of text;
   harmonizing existing data in the predetermined group with the first set of text to modify the first set of features;
   categorizing the first set of text;
   determining analytics-based rules based at least in part on the first set of features;
   aggregating the first set of text with existing data;
   harmonizing the aggregated data and a second set of text into a second set of features, wherein the second set of text is represented in a second image portion classified into the predetermined group;
   analyzing the second set of features; and
   adapting at least one of the classifying step and the harmonizing step based on the analyzed second set of features.

2. The method of claim 1, further comprising sorting the first set of text into predetermined structures, wherein the predetermined structures comprise at least one of the group consisting of words, numbers, dates, sentences, paragraphs, tables, and alphanumeric codes.

3. The method of claim 2, wherein the classification of the first image portion is based at least in part on the predetermined structures into which the first set of text is sorted.

4. The method of claim 1, further comprising receiving a second set of text, wherein the second set of text is not obtained from the first image portion.

5. The method of claim 1, further comprising at least one of adding and modifying at least one feature for the first set of features.

6. The method of claim 1, wherein the analytics-based rules are used at least in part to correct errors in the first set of text.

7. The method of claim 1, wherein the method is performed on a large area network.

8. The method of claim 1, further comprising initially analyzing the first set of text using optical character recognition.

9. The method of claim 1, wherein classifying the first image portion into the predetermined group based at least in part on the first set of text comprises classifying the first image portion based on orders of words in the predetermined group.

10. A filter-based text recognition system for cataloging image portions associated with files using text from the image portions, the system comprising:
    a memory; and
    processing circuitry coupled with the memory, wherein the processing circuitry is operable to:
      receive a first set of text represented in a first image portion associated with a first file;
      classify the first image portion into a predetermined group, wherein the classifying is based at least in part on the first set of text;
      extract a first set of features from the first set of text;
      harmonize existing data in the predetermined group with the first set of text to modify the first set of features;
      categorize the first set of text; and
      determine analytics-based rules based at least in part on the first set of features and correcting the first set of text by appending additional data based on the rules.

11. The system of claim 10, wherein the processing circuitry is further operable to aggregate the first set of text with existing data.

12. The system of claim 11, wherein the processing circuitry is further operable to:
    harmonize the aggregated data and a second set of text into a second set of features, wherein the second set of text is represented in a second image portion classified into the predetermined group;

analyze the second set of features; and adapt at least one of the classifying step and the harmonizing step based on the analyzed second set of features.

13. The system of claim 10, wherein the processing circuitry is further operable to sort the first set of text into predetermined structures, the predetermined structures comprise at least one of the group consisting of words, numbers, dates, sentences, paragraphs, tables, and alphanumeric codes.

14. The system of claim 13, wherein the classification of the first image portion is based at least in part on the predetermined structures into which the first set of text is sorted.

15. The system of claim 10, wherein the processing circuitry is further operable to receive a second set of text, wherein the second set of text is not obtained from the first image portion.

16. The system of claim 10, wherein the first set of text is obtained using an optical character recognition technique.

17. The system of claim 10, wherein the processing circuitry is further operable to at least one of add and modify at least one feature for the first set of features.

18. The system of claim 10, wherein the system is a large area network.

19. The system of claim 10, wherein the analytics-based rules comprise searching for a particular word in the first image portion.

20. A non-transitory computer-readable storage medium for cataloging image portions associated with files using text from the image portions, the computer-readable storage medium being non-transitory and having computer-readable program code portions stored therein that in response to execution by a processing circuitry, cause an apparatus to at least:

receive a first set of text represented in a first image portion associated with a first file;

classify the first image portion into a predetermined group, wherein the classifying is based at least in part on the first set of text;

extract a first set of features from the first set of text;

harmonize existing data in the predetermined group with the first set of text to modify the first set of features;

categorize the first set of text;

determine analytics-based rules based at least in part on the first set of features;

aggregate the first set of text with existing data;

harmonize the aggregated data and a second set of text into a second set of features, wherein the second set of text is represented in a second image portion classified into the predetermined group;

analyze the second set of features; and adapt at least one of the classifying step, and the harmonizing step based on the analyzed second set of features.

* * * * *